(12) United States Patent
Long (10) Patent No.: US 6,700,248 B2
(45) Date of Patent: Mar. 2, 2004

(54) NON-LINEAR MAGNETIC MOTION CONVERTER

(75) Inventor: Johnny D. Long, Powell, TN (US)

(73) Assignee: Harmonic Drive, Inc., Knoxville, TN (US)

( * ) Notice: Subject to any disclaimer, the term of this patent is extended or adjusted under 35 U.S.C. 154(b) by 0 days.

(21) Appl. No.: 10/141,718

(22) Filed: May 9, 2002

(65) Prior Publication Data

US 2002/0167235 A1 Nov. 14, 2002

Related U.S. Application Data (60) Provisional application No. 60/289,871, filed on May 9, 2001.

(51) Int. Cl.$^7$ .............................................. H02K 33/00
(52) U.S. Cl. .......................... 310/80; 310/103; 310/20; 74/25
(58) Field of Search ......................... 310/80, 37, 20, 310/103, 152; 74/25; 464/29

(56) References Cited

U.S. PATENT DOCUMENTS

| | | | |
|---|---|---|---|
| 979,637 A | 12/1910 | Backer | 310/137 |
| 1,283,430 A | 10/1918 | Warren | 310/103 |
| 2,378,129 A * | 6/1945 | Chambers | 310/103 |
| 2,414,688 A * | 1/1947 | Chambers | 310/103 |
| 2,790,095 A * | 4/1957 | Peek et al. | 310/103 |
| 2,987,657 A | 6/1961 | Buchtenkirch et al. | 335/228 |
| 3,355,645 A * | 11/1967 | Kawakami et al. | 310/103 |
| 3,636,391 A | 1/1972 | Horner et al. | 310/24 |
| 3,688,136 A | 8/1972 | Salverda | 310/24 |
| 3,703,653 A | 11/1972 | Tracy et al. | 310/24 |
| 3,801,095 A * | 4/1974 | Woron | 273/1 M |
| 3,840,763 A | 10/1974 | Baumann et al. | 310/156.56 |
| 4,196,365 A * | 4/1980 | Presley | 310/23 |
| 4,354,126 A | 10/1982 | Yates et al. | 310/156.59 |
| 4,456,858 A | 6/1984 | Loven | 318/138 |
| 4,571,528 A | 2/1986 | McGee et al. | 318/138 |
| 4,598,221 A * | 7/1986 | Lawson et al. | 310/103 |
| 4,600,849 A * | 7/1986 | Lawson et al. | 310/103 |
| 4,714,854 A | 12/1987 | Oudet | 310/268 |
| 4,983,867 A | 1/1991 | Sakamoto | 310/49 R |
| 5,153,473 A | 10/1992 | Russell | 310/181 |
| 5,295,031 A | 3/1994 | Wasson | 360/106 |
| 5,585,680 A | 12/1996 | Tsoffka | 310/478 |
| 5,760,503 A | 6/1998 | Tsuchida et al. | 310/49 R |
| 5,886,442 A | 3/1999 | Ogino et al. | 310/181 |
| 6,002,184 A | 12/1999 | Delson et al. | 310/14 |
| 6,037,690 A | 3/2000 | Hill | 310/168 |
| 6,051,902 A | 4/2000 | Ogino et al. | 310/154 |
| 6,087,751 A | 7/2000 | Sakai | 310/156.45 |
| 6,268,677 B1 | 7/2001 | Takabatake et al. | 310/156.55 |
| 6,274,959 B1 | 8/2001 | Uchiyama | 310/152 |
| 6,323,572 B1 | 11/2001 | Kinoshita | 310/156.07 |
| 6,326,714 B1 | 12/2001 | Bandera | 310/156.38 |
| 6,342,745 B1 | 1/2002 | Sakai et al. | 310/156.56 |

\* cited by examiner

Primary Examiner—Karl Tamai
(74) Attorney, Agent, or Firm—Pitts & Brittian, P.C.

(57) ABSTRACT

A non-linear magnetic harmonic motion converter apparatus for transferring non-linear motion into rotational motion for producing work from an interaction of at least two magnetic fields. An axial shaft is disposed in rotating relationship with at least one gimbal supported magnet that reciprocates in relation to the axial shaft. At least one rotor magnet is disposed to rotate in relation to the axial shaft in response to non-linear movement of the at least one gimbal supported magnet. A plurality of rotor magnet units may be proximally disposed to rotate about separate axial shafts, with each rotor magnet unit having a rotor magnetic field influenced by the non-linear movement of the at least one gimbal supported magnet disposed proximal to each rotor magnet unit. Movement of the each gimbal supported magnet creates repulsion and attraction of each respective rotor magnet, with inducement of axial shaft rotation, thereby producing rotational movement that is harnessed to perform work. Also disclosed are combinations of rotor magnet units disposed to rotate about respective axial shafts upon the reciprocation of a central gimbal supported magnet, for utilization in the operation of a fluid transfer pump and/or an electric generator.

14 Claims, 7 Drawing Sheets

NON-LINEAR MAGNETIC MOTION CONVERTER

CROSS-REFERENCE TO RELATED APPLICATIONS

This application claims the benefit of U.S. Provisional Application No. 60/289,871, filed May 9, 2001.

STATEMENT REGARDING FEDERALLY SPONSORED RESEARCH OR DEVELOPMENT

Not Applicable

BACKGROUND OF THE INVENTION

1. Field of Invention

This invention pertains to an apparatus for non-linear motion conversion using magnets that convert movement in a non-linear direction into linear or rotational motion. More particularly, this invention pertains to a plurality of magnets disposed proximal to each other for energy conversion of reciprocating non-linear or rotational movement into useful motion in rotational or linear movement.

2. Description of the Related Art

Prior magnetic drive mechanisms include a combination of a rotor and a stator with the rotor having at least one magnet thereon for rotation about the stator. According to magnetic principles, magnetic fields of rotors and stators interact in symmetrical alignment in radial fashion and concentric relationship with a magnetically driven output shaft. Magnetic or electromagnetic components of prior magnetic drive mechanisms rotate to a top, dead or center position, utilizing skewed magnetic lines as the components seek alignment and de-energizing prior to a top, dead or center position by timing methods to allow the rotor to continue in a rotational path. In prior magnetic drive mechanisms the stator includes a plurality of inwardly oriented poles and the rotor includes a plurality of outwardly oriented poles. In basic electromagnetic motor designs, the speed of the output shaft is a function of the frequency with which the polarities and voltages are alternated in relation to proper timing of the rotation and orientation of the respective magnetic fields generated to influence the rotor and/or the stator. Timing is addressed by coil arrangements, voltage frequency, reversal of current and electronic controls known to those skilled in the art.

One example of a prior art device is an electromagnetic motor with a rotating disc and a rotating magnet on a shaft coupled to the disc. The magnetic motor includes a reciprocating magnet aligned proximal to, and movable toward and away from, the rotating magnet in order to repel the rotating magnet. The rotating magnet includes a predetermined number of permanent magnets disposed radially outward from the shaft. The rotating magnets are disposed substantially within the magnetic field of the reciprocating magnet for interaction of the magnetic fields of the rotating magnet and the reciprocating magnet through repulsion or attraction. The magnetic motor requires an actuator means and timing means for displacing the reciprocating magnetic assembly with respect to the rotating magnetic assembly to provide interaction with the magnetic fields of the rotating magnet and the reciprocating magnet to impose a rotational force on the shaft.

Another example of a prior art device is a rotor apparatus including a permanent magnet type rotating machine having a stator with armature windings thereon. The rotor includes a rotor and a plurality of permanent magnets arranged on the rotor core so as to negate magnetic flux of the armature windings passing through interpoles. The rotor is constructed so that the average of magnetic flex in an air gap between the rotor and the stator which is produced by the permanent magnets at the armature windings, provides a rotating machine which operates as an induction machine at the machine's starting and also operates as a synchronous machine at the rated driving due to smooth pull-in.

There is a need for a system for motion and force conversion that utilizes a plurality of magnets oriented for converting non-linear motion from an external energy source, into rotational motion for a pair of rotor magnets radially disposed in relation to a central magnetic element that is attracted or repulsed at multiple pivot angles to cause continuous rotary motion upon movement of the rotor magnets.

Further, it is an object of the present invention to provide an apparatus having units of motion and force conversion that are joined by stacking in parallel or by connecting in series to produce significant power outputs in relation to motion or energy inputs to each unit.

Additionally, it is an object of the present invention to provide a motion and force converter that operates without partial or incomplete strokes, and does not provide variations of amplitude by a reciprocating member where a continuous torque is desired.

BRIEF SUMMARY OF THE INVENTION

A motion and energy conversion apparatus for transferring non-linear motion of a gimbal supported magnet into rotational motion of at least one rotor magnet for producing power from the interaction of the magnetic fields of the gimbal supported magnet and the at least one rotor magnet. The motion and energy conversion apparatus includes a rotor element having at least one rotor magnet disposed to rotate in relation to an axial shaft proximal to the rotor element. The at least one rotor magnet includes a rotor magnet field defined by respective north and south poles oriented in a circumferential path of rotation about the axial shaft, with the net flux fields of the north and south poles directed substantially perpendicular to a radius from the axis of rotation of the axial shaft.

A gimbal magnet is disposed in a gimbal supported configuration to allow the gimbal supported magnet to reciprocate in relation to the axial shaft and the at least one rotor magnet. The gimbal supported magnet is positioned to extend a gimbal magnet field to the axial shaft, with the gimbal magnet field repositioned by the movements of the gimbal supported magnet. The reciprocating movement of the gimbal magnet field influences the rotor magnet field of the at least one rotor magnet with resulting rotation of the axial shaft. The gimbal supported magnet exhibits anisotropic properties having different magnetic flux field values when measured along axes in different directions. The gimbal supported magnet is reciprocated in response to non-linear motion to influence movement of at least one rotor magnet and rotation of the axial shaft. Additional embodiments include a plurality of rotor magnets disposed in spaced apart orientation along the axial shaft to provide a plurality of rotor magnet fields sufficiently proximal to the gimbal supported magnet to attract and repulse the rotor magnets in response to movement of the gimbal supported magnet. With repeated non-linear movement of the gimbal magnet, repetitive repulsion and attraction of the rotor magnet field produces rotational movement of the axial shaft that is harnessed to perform work. The non-linear motion of the apparatus is utilizable as an energy conversion device, as a water wave energy converter, as a pumping device for movement of fluids, and/or as a generator of electrical energy.

BRIEF DESCRIPTION OF THE SEVERAL VIEWS OF THE DRAWINGS

The above-mentioned features of the invention will become more clearly understood from the following detailed description of the invention read together with the drawings in which:

FIG. 7b is a side perspective view of a gimbal supported lever arm of FIG. 7a;

FIG. 8b is a side perspective view of one rotor magnet of FIG. 8a; and

DETAILED DESCRIPTION OF THE INVENTION

An apparatus for a non-linear magnetic harmonic motion converter 10 is disclosed as generally illustrated in FIGS. 1a, 1b, 2a and 2b. In one embodiment, the motion converter 10 provides conversion of non-linear, reciprocating movement into rotational motion by the interaction of first and second magnetic fields created by the north and south magnetic poles of a plurality of magnets positioned in a spaced apart configuration around an axis of rotation 32. The motion converter 10 includes a gimbal supported ring magnet 12 disposed to reciprocate in a gimbal movement around the axis of rotation 32 that is substantially parallel to a rotational shaft 26. The gimbal supported ring magnet 12 includes a north pole inner perimeter 14, and a south pole outer perimeter 16. An alternative embodiment may have the outer perimeter as the north pole and the inner perimeter as the south pole of the gimbal supported ring magnet 12. An inner magnet ring 18 is attached around the rotational shaft 26 to tilt in different angles with the gimbal supported ring magnet 12. The attachments for the inner magnet ring 18 include pivot connectors 20, 20' and pivot connector bracket 22 (see FIG. 1a). Pivot connector bracket 22 includes a central passage (not shown) for insertion of the rotational shaft 26 therethrough. Disposed in spaced apart configuration along the rotational shaft 26 is at least one rotor magnet 24, and preferably a pair of rotor magnets 24, 24'. Upon the input of an external reciprocating force on the gimbal supported ring magnet 12, the ring magnet 12 is reciprocatingly pivoted in a gimbal movement including varying directions 30, 30' depending on the external force, with reciprocating pivoting of the inner magnet ring 18 depending on the orientation of the magnetic fields of the outer ring magnet 12 and the inner magnet ring 18. As the outer ring magnet 12 and inner magnet ring 18 reciprocate, the magnetic fields of the respective north and south poles of the outer ring magnet 12 influences the north and south magnetic fields of the pair of rotor magnets 24, 24', with resulting rotation 28 of the rotational shaft 26.

Figures 1A, 1B:
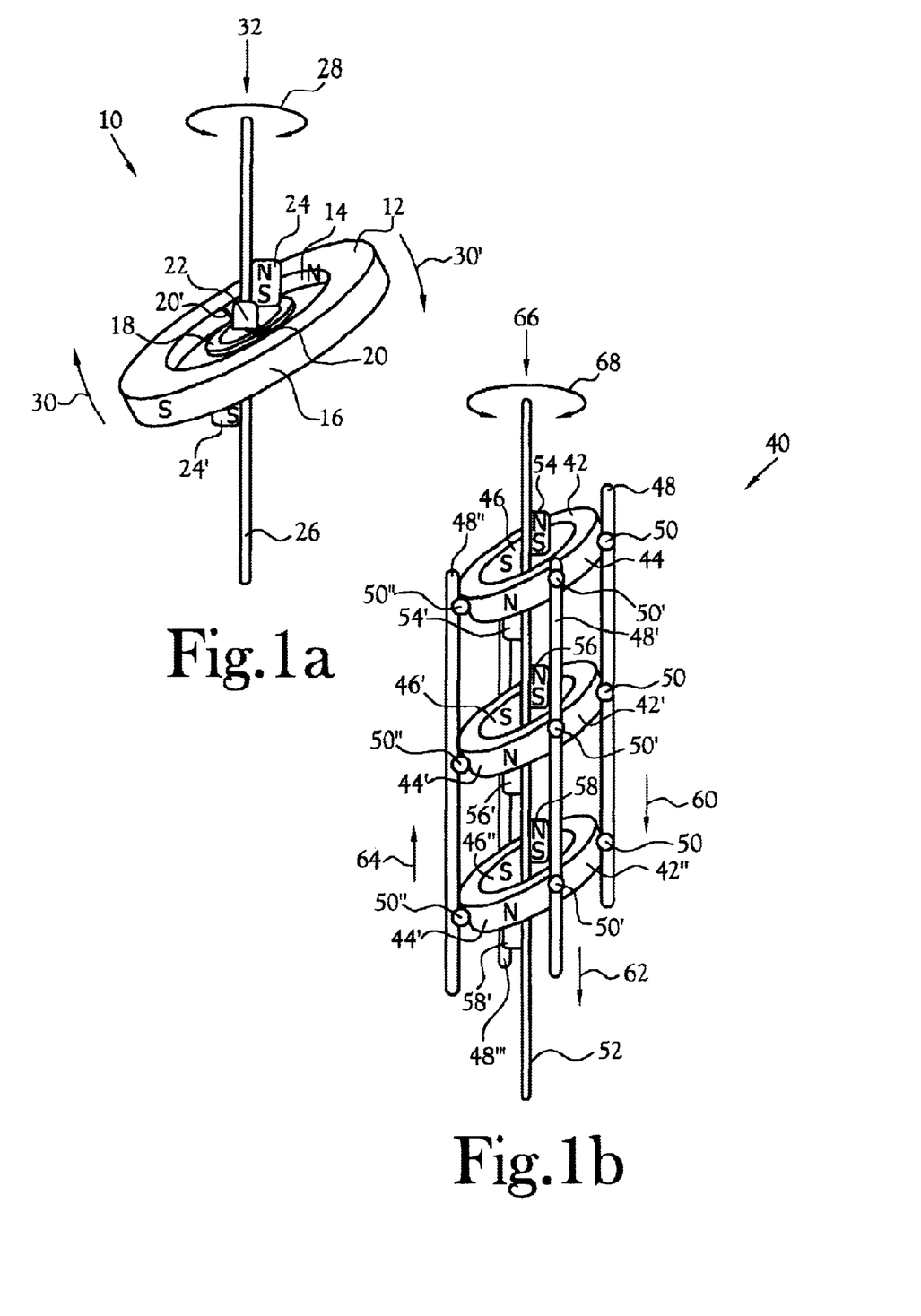
FIG. 1a is a side perspective view of a non-linear magnetic harmonic motion converter of the present invention illustrating a gimbal supported frame member having at least one perimeter magnet mounted to reciprocate in relation to an axial shaft with at least one rotor magnet positioned on an axial shaft.
FIG. 1b is side perspective view of a plurality of gimbal supported frame members, each having at least one perimeter magnet mounted thereon, and having a plurality of rotor magnets positioned on an axial shaft.

The one rotor magnet 24 or the pair of rotor magnets 24, 24' include an anisotropic permanent magnet attached to the rotational shaft 26 (see FIG. 1a). The rotor magnets 24, 24' include respective north and south poles oriented from opposed sides of each rotor magnet 24, 24'. The magnetic flux fields of the rotor magnets 24, 24' are oriented in a circumferential path of rotation about the rotational shaft 26, with the net flux fields of the north and south poles of the rotor magnets 24, 24' directed substantially perpendicular to a radius from the axis of rotation 32 of the rotational shaft 26. Movement 30, 30' of the gimbal supported ring magnet 12 is effective in causing the re-orientation of the magnetic fields created by the north and south magnetic poles of the ring magnet 12, with the attracting and repelling of the rotor magnets 24, 24', and rotation of the rotational shaft 26 that is harnessed to perform work.

In an alternative embodiment of a motion converter 40 (see FIG. 1*b*), a plurality of gimbal supported magnet rings 42, 42', 42" are disposed to move in relation to an axial shaft 52 rotatable about an axis of rotational 66 (see FIG. 1*b*). Each magnet ring 42, 42', 42" includes a north pole outer perimeter 44, and a south pole inner perimeter 46. An alternative embodiment may have the outer perimeter as the south pole and the inner perimeter as the north pole for each of the gimbal supported magnet rings 42, 42', 42". The motion converter 40 includes at least two, and preferably three or four connecting frame members 48, 48', 48", 48'", that are aligned in substantially parallel arraignment having a plurality of gimbal supported magnet rings 42, 42', 42" supported therebetween. Each respective magnet ring is attached at a plurality of pivot points 50, 50', 50" positioned to connect on the perimeter of each magnet ring 42, 42', 42" to maintain a pivoting connection with each respective frame member 48, 48', 48", 48'". An axial shaft 52 is disposed to rotate 68 within the aligned magnet rings 42, 42', 42". The axial shaft 52 includes a plurality of rotor magnets 54, 54', 56, 56', 58, 58', that are paired to extend on opposed sides of the axial shaft 52. The magnetic flux fields of the rotor magnets 54, 54', 56, 56', 58, 58' are oriented in a circumferential path of rotation about the axial shaft 52, with the net flux fields of the north and south poles of the rotor magnets 54, 54', 56, 56', 58, 58' directed substantially perpendicular to a radius from the axis of rotation 66 of the axial shaft 52. Gimbal movement 60, 62, 64 of each respective portion of the aligned gimbal supported magnet rings 42, 42', 42" is effective in causing the re-orientation of the magnetic fields created by the north and south magnetic poles of the magnet rings 42, 42', 42", and results in the creation of rotation of the rotor magnets 54, 54', 56, 56', 58, 58' and rotation 68 of the axial shaft 52 that is harnessed to perform work.

Figure 2A:
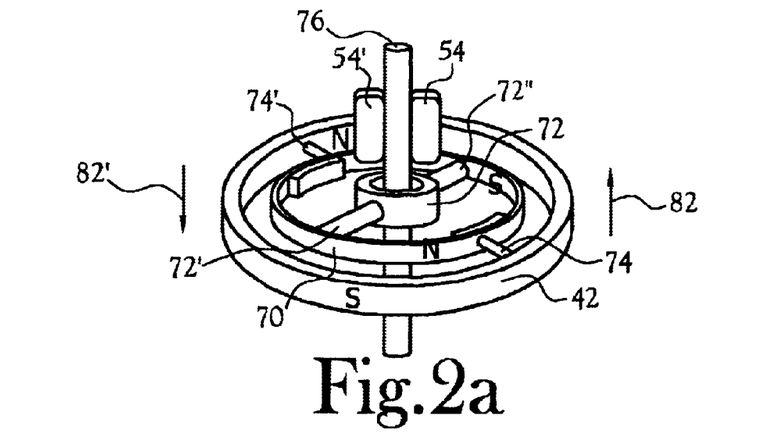
FIG. 2a is a side perspective view of an alternative embodiment of FIG. 1b, illustrating a gimbal supported frame member mounted to a flotation device for reciprocating motion of the plurality of gimbal supported ring magnets in relation to an axial shaft having a plurality of rotor magnets thereon.
Figure 2B:
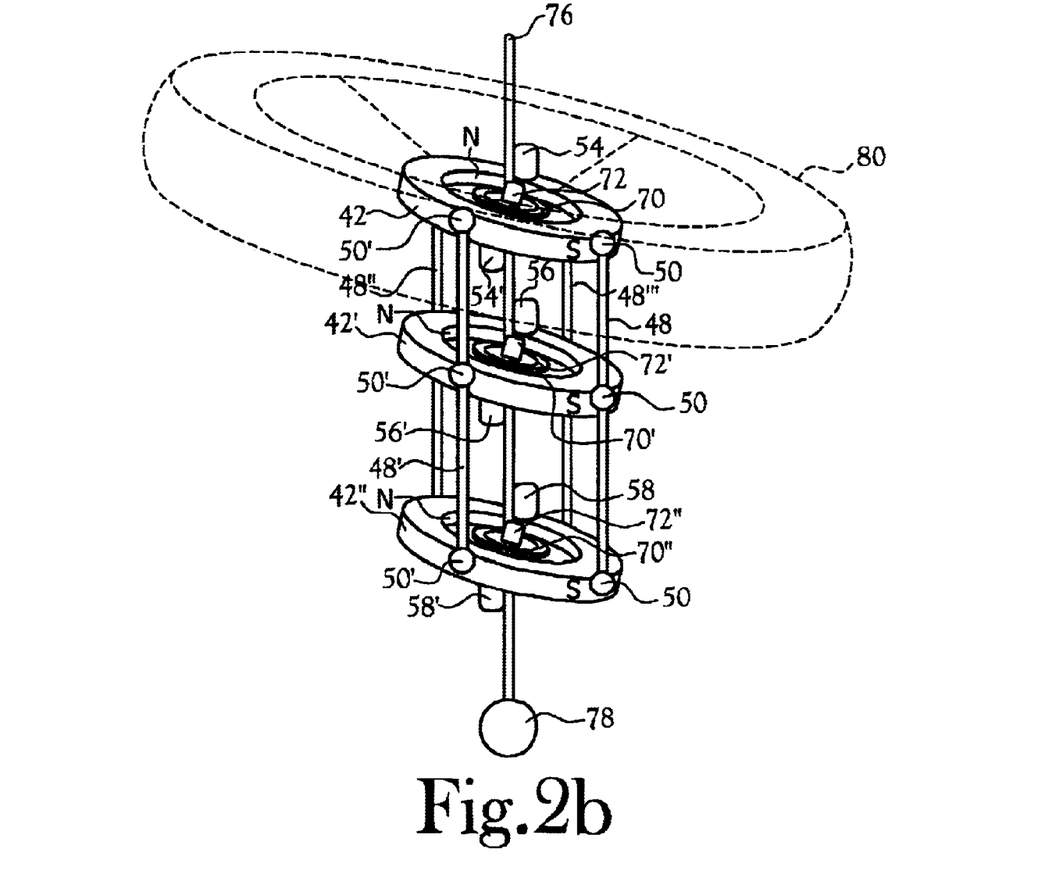
FIG. 2b is a side perspective view illustrating a connecting pivot junction for each gimbal supported ring magnet of FIG. 2b.

As illustrated in FIGS. 2*a* and 2*b*, an alternative embodiment of the motion converter of FIGS. 1*a* and 1*b* includes a motion converter having a plurality of inner rings 70, 70', 70", each having a pivot junction with a rotating axial shaft 76 disposed within each of a plurality of outer gimbal supported magnet rings 42, 42', 42". Each magnet ring 42, 42', 42" includes a north pole inner perimeter, and a south pole outer perimeter. An alternative embodiment may have the outer perimeter as the north pole and the inner perimeter as the south pole of the gimbal supported magnet rings 42, 42', 42". Each outer magnet ring is interconnected by a plurality of support members 48, 48', 48", 48'" having pivot points 50, 50' connected to each respective perimeter of each magnet ring 42, 42', 42". Each outer magnet ring 42, 42', 42" is maintained apart from the axial shaft 76 by the inner rings 70, 70', 70" that are separately connected by a pivot bracket connector 72 having a pair of extension arms 72', 72" connected to each respective inner ring 70, 70', 70". The axial shaft 76 includes at least one pair of rotor magnets 54, 54', and preferably a plurality of rotor magnets 54, 54', 56, 56', 58, 58', that are paired to extend on opposed sides of the axial shaft 76. The magnetic flux fields of the rotor magnets 54, 54', 56, 56', 58, 58' are oriented in a circumferential path of rotation about the axial shaft 76, with the net flux fields of the north and south poles of the rotor magnets 54, 54', 56, 56', 58, 58' directed substantially perpendicular to a radius from the axial shaft 76. As illustrated in FIG. 2*6*, a flotation device 80 may encircle the motion converter. The device 80 may include a central housing (not shown) that is releasably attachable by a plurality of connector members radially extended from the interior of the flotation device 80, to connect the central housing around the motion converter including a plurality of gimbal supported magnet rings 42, 42', 42". One or more of the gimbal supported magnet rings 42, 42', 42" may be attached to the central housing of the flotation device 80, in order to allow at least one or more of the magnet rings 42, 42', 42" to freely reciprocate in response to movement of the flotation device 80. An alternative embodiment includes a cylindrical housing (not shown) or a spherical housing (see FIG. 3) that is releasably attachable within the flotation device 80, with the motion converter suspended interior of the housing that is preferably water-tight. As the flotation device 80 is moved in a non-linear motion by waves of a body of water, the gimbal supported magnet rings 42, 42', 42" are moved, with re-orientation of the respective magnetic fields of the magnet rings 42, 42', 42" and alternating attracting and repelling of rotor magnets 54, 54', 56, 56', 58, 58', with resulting rotation of the rotor magnets 54, 54', 56, 56', 58, 58' and rotation of the axial shaft 76. The rotation of the axial shaft 76 may be harnessed by connection to a rotational motion conversion device (not shown) and associated electrical circuitry (not shown) for conversion of rotation of motion into electrical energy for storage or for powering of audio or visual alarm equipment attached to the flotation device 80. A weight 78 may be attached to a lower end of the motion converter, opposite the end attached to the flotation device 80, to maintain the motion converter in an upright position regardless of the turbulence created by waves of the body of water.

Figure 3:
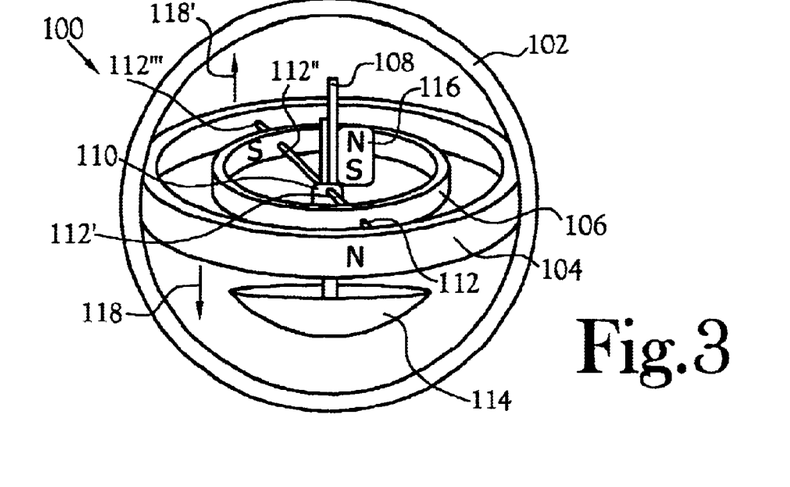
FIG. 3 is a side perspective view of an alternative embodiment of FIG. 2b, illustrating a gimbal supported frame member including a second gimbal supported frame member having a ring magnet connected to move about a plurality of rotor magnets disposed on an axial shaft.

As illustrated in FIG. 3, an alternative embodiment of FIGS. 2*a* and 2*b* includes a harmonic motion converter 100 including a cylindrical housing 102 enclosing an outer gimbal supported magnet ring 104 having north and south poles on respective outer and inner perimeters of the magnet ring 104. The magnet ring 104 is free to move 118, 118' in a gimbal-like manner within the cylindrical housing 102 in one embodiment, or in an alternative embodiment is attachable at two positions along the outer perimeter of the gimbal ring magnet 104 by pivot connections (not shown) to an interior surface of the cylindrical housing 102. Within the outer gimbal ring magnet 104 is disposed an inner ring 106 that is attached by at least two pivot points by pivot arms 112, 112'" to an interior perimeter of gimbal ring magnet 104, so that inner ring 106 is pivotable within outer gimbal ring magnet 104, which is reciprocatingly moved 118, 118' in a gimbal-like manner in relation to cylindrical housing 102. Inner ring 106 may include north and south poles, either along respective inner and outer perimeter of the inner ring 106, or reversed in polarity, or may have one portion of the inner and outer perimeter of the inner ring 106 having a north polarity, and an opposed portion of the inner perimeter and outer perimeter of the inner ring 106 having a south polarity (not shown). Inner ring 106 is attached by at least two pivot arms 112', 112" to a connector sleeve 110. Supported by the connector sleeve 110 within the inner ring 106 is an axial shaft 108 that is rotatable in relation to the inner ring 106 and the outer gimbal ring magnet 104. One rotor magnet 116, or preferably a pair of rotor magnets 116, 116' are disposed in opposed orientation along the axial shaft 108. Reciprocating movement of the circular housing 102 is effective in causing the re-orientation of the magnetic fields created by the north and south magnetic poles of the gimbal ring magnet 104, and the north and south magnetic poles of the inner ring 106, resulting in the creation of rotation of the rotor magnets 116, 116' and rotation of the axial shaft 108, providing rotational movement that is harnessed to perform work or is converted by circuitry into electrical energy for storage or for powering audio and/or visual devices. A counterweight 114 is attachable in alignment with the axis of rotation of the axial shaft 108, to maintain the outer gimbal ring magnet 104, the inner ring 106, and the axial shaft in substantially upright position regardless of the rotation of the cylindrical housing 102 caused by turbulence created by waves of the body of water, or rolling of the cylindrical housing 102 along a path on land or within an enclosing machinery unit.

Figure 4:
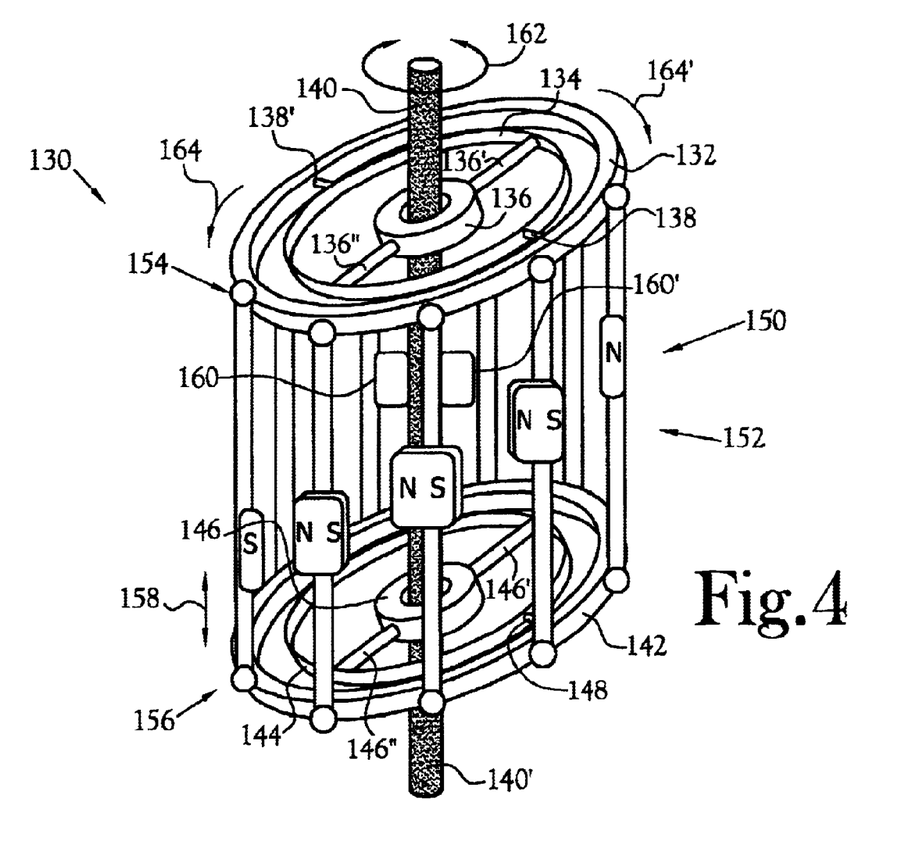
FIG. 4 is a side perspective view of an alternative embodiment of FIG. 2a, illustrating a gimbal supported frame member having a plurality of perimeter magnets disposed on perimeter supports, with a pair of rotor magnets disposed on an axial shaft positioned through the gimbal supported frame member.

As illustrated in FIG. 4, an alternative embodiment of a harmonic motion converter 130 includes a first outer gimbal ring magnet 132, and inner ring magnet 134 pivotably supported within the outer gimbal ring magnet 132 by a pivot bracket 136 having connecting arms 136', 136" and outer connector arms 138, 138'. Outer gimbal ring magnet 132 is connected by a plurality of pivot connections 154 to a plurality of perimeter support frame members 152 that are substantially aligned to encircle first outer gimbal ring magnet 132, and second outer gimbal ring magnet 142 that is pivotably connected by a plurality of pivot connections 156 to the plurality of perimeter support frame members 152. A second inner ring 144 is pivotably supported within the second outer gimbal ring magnet 142 by a pivot bracket 146 having connecting arms 146', 146" and by outer connector arms 148, 148' to second outer gimbal ring magnet 142. An axial shaft 140 is disposed through pivot brackets 136 and 146, with the axial shaft having at least one pair of rotor magnets 160, 160' disposed in opposed orientation thereon. The axial shaft 140 and rotor magnets 160, 160' are freely rotatable 162 in relation to first outer gimbal ring magnet 132 and second outer gimbal ring magnet 142. Lateral rotation 164 and/or vertical movements 158 of perimeter support frame members 152 create movement of each of the aligned gimbal supported magnet rings 132, 142, causing the re-orientation of the magnetic fields created by the north and south magnetic poles of the ring magnets 132, 142, resulting in the creation of rotation of at least one pair of rotor magnets 160, 160', and the rotation of the axial shaft 140 that is harnessed to perform work or transfer of rotational energy at opposed end 140' of the axial shaft 140. An alternative embodiment of the harmonic motion converter of FIG. 4, or other embodiments disclosed herein, includes the plurality of perimeter magnets 150 including a plurality of electromagnets (not shown) disposed on respective perimeter support member, with each electromagnet connected electrically to circuitry and a power means for timing the electrical pulses to each electromagnet, thereby providing a timed, repetitive change in the electrical pulses to each electromagnet for repetitively changing the north and south polarity of each of the perimeter located electromagnets. With each change in polarity of the electromagnets, a re-orientation of the respective electromagnetic fields occurs to provide a means for reciprocating the polarity of the electromagnetic fields, therefore inducing rotation of rotor magnets 160, 160' and corresponding rotation 162 of axial shaft 140 to perform work.

Figure 5A:
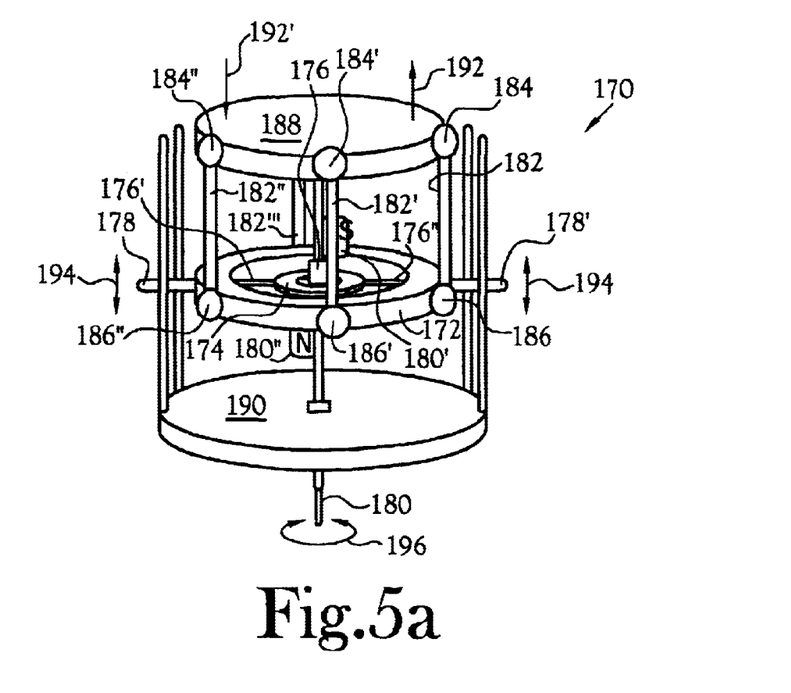
FIG. 5a is a side perspective view of an alternative embodiment of FIG. 4 illustrating a base platform supporting to a gimbal supported platform having at least one ring magnet attached thereto and at least one rotor magnet disposed on an axial shaft positioned through the base platform.
Figure 5B:
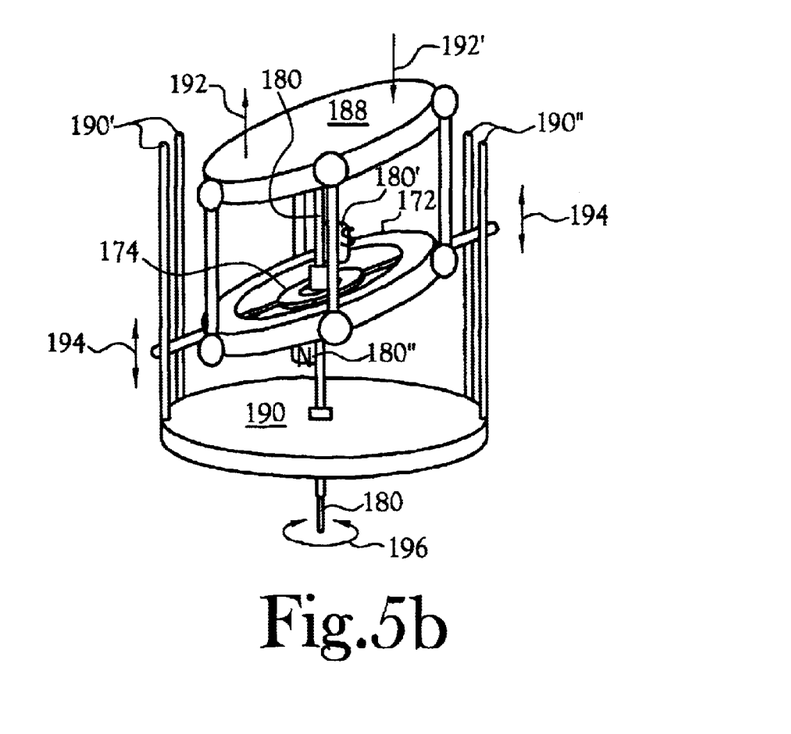
FIG. 5b is a side perspective view of FIG. 5a illustrating a tilted gimbal supported platform attached to a tilted ring magnet.

An alternative embodiment of the harmonic motion converter 170 is illustrated in FIGS. 5a and 5b, including one outer gimbal ring magnet 172, and inner ring magnet 174 pivotably supported within the outer gimbal ring magnet 172 by a pivot bracket 176 having connecting arms 176', 176". Extended outwardly from the outer perimeter of the outer gimbal ring magnet 172 is at least two pivot arms 178, 178', which extend on opposed sides of the outer perimeter for positioning the ring magnet 172 between respective pairs of guide channels 190' and 190" that extend upwards from a platform base 190. The perimeter of the outer gimbal ring magnet 172 is pivotably attached by pairs of connector pivots 186, 186', 186", 186"' (not shown) to a plurality of perimeter support frame members 182, 182', 182", and 182"' (see FIGS. 5a and 5b). An upper platform 188 is attached in a concentric and spaced apart orientation from the outer gimbal ring magnet 172, with the outer perimeter of the upper platform attached to respective perimeter support frame members 182, 182', 182", 182"' by pairs of connector pivots 184, 184', 184", 184"'(not shown). An axial shaft 180 is rotatable 196 in relation to the pivot bracket 176 and the platform base 190. At least two rotor magnets 180' and 180" are disposed in spaced apart positions along the axial shaft 180. Rotor magnets 180', 180" may be oriented between a range of about 90 degrees to about 180 degrees separation from each other, or any alternative angle of separation that allows the axial shaft 180 to remain balanced during rotation 196. A second position of the upper platform and outer gimbal ring magnet 172 is illustrated in FIG. 5b, demonstrating vertical movement 194, in addition with angled tilting upwards 192 and downwards 192' of the gimbal ring magnet 172 and platform 188, with the re-orientation of the magnetic fields created by the north and south magnetic poles of the gimbal ring magnet 172, and resulting in the creation of rotation of at least one pair of rotor magnets 180', 180" and resulting in rotation 196 of the axial shaft 180 to perform work.

Figure 6A:
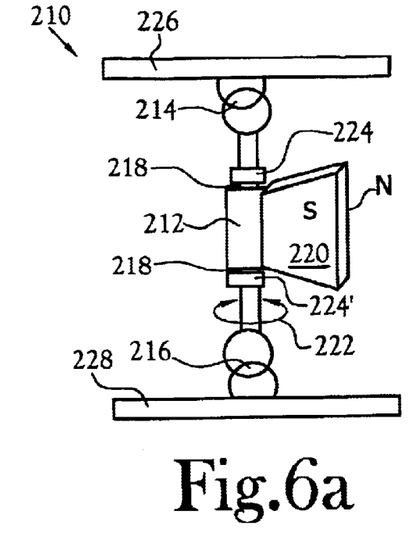
FIG. 6a is a side view of an alternative embodiment of the invention illustrating a sleeve unit rotatable about an axial shaft, with the sleeve unit having at least one rotor magnet thereon and having upper and lower linkages to platform magnets that are displaced in a gimbaled motion in relation to the axial shaft.
Figure 6B:
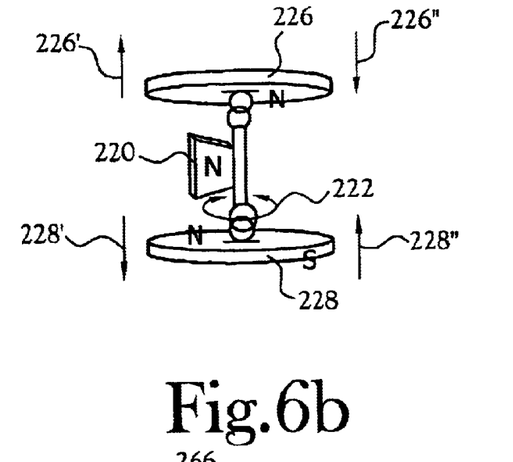
FIG. 6b is a side view of FIG. 6a, illustrating a sleeve unit in gimbal supported connection with an upper platform and a lower platform having magnets thereon, with at least one rotor magnet rotated about the axial shaft in response to the gimbaled motion of the upper and lower platform.

An alternative embodiment of a mechanism for use in the motion converters disclosed herein is a sleeve bracket 210 illustrated in FIGS. 6a and 6b. The sleeve bracket 210 includes a sleeve bearing 212 having at least one rotor magnet 220 extended therefrom. The sleeve bearing 212 is rotatable 222 about an axial shaft 218, and is restrained from moving up or down along the axial shaft 218 by respective raised spacers 224, 224'. The axial shaft 218 is attachable between a first gimbal connector 214 and a second gimbal connector 216. The gimbal connectors 214, 216 are attached to respective first supporting platform 226 and second supporting platform 228. First supporting platform 226 is free to rotate and/or reciprocate 226', 226" in spaced apart orientation from the rotation of second supporting platform 228 and/or reciprocation 228', 228". The north and south poles of the rotor magnet 220 are oriented to rotate in a circumferential path of rotation about the axial shaft 218, with the net flux fields of the north and south poles directed substantially perpendicular to a radius from the axis of rotation 222 around the axial shaft 218. FIG. 6b illustrates the potential movements 226', 226" of first platform 226 having north and south magnet poles thereon, and the movements 228', 228" of second platform 228 having north and south magnet poles thereon, with resulting attracting and repelling of the rotor magnet 220 and resulting rotation 222 of sleeve bearing 212 to perform work, move fluids, and/or to power an electrical generator.

Figure 7A:
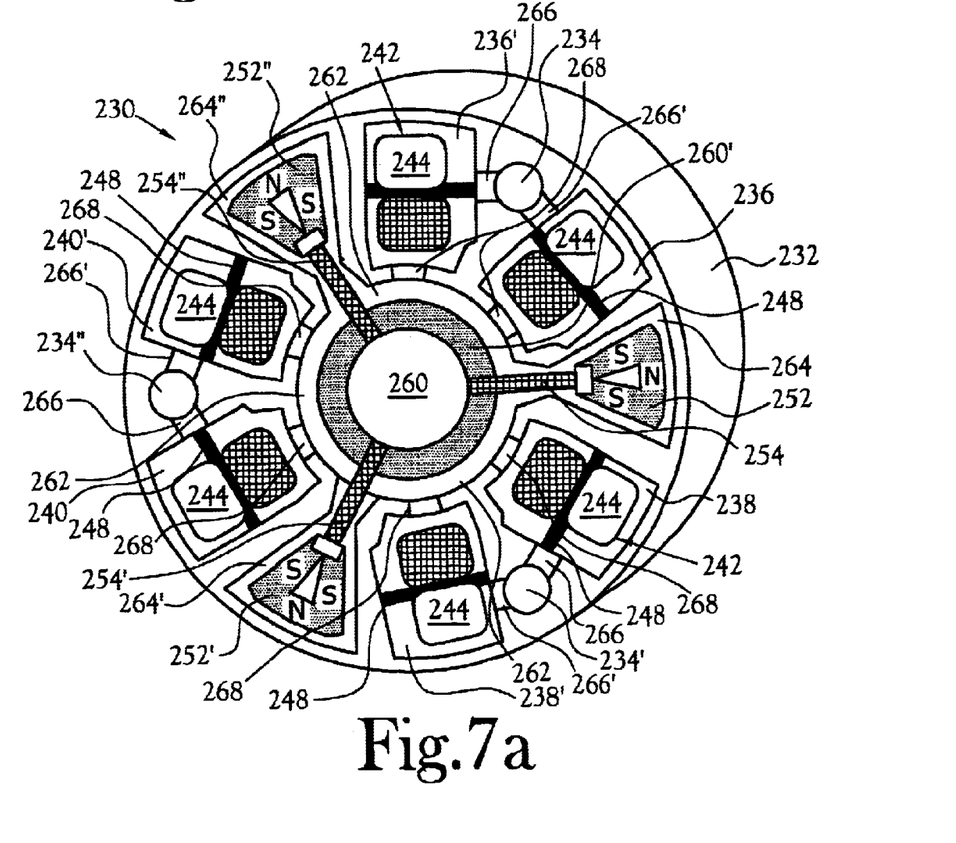
FIG. 7a is a cross-sectional side perspective view of a pump assembly illustrating a plurality of rotatable impeller fins and a plurality of rotor magnets interdisposed between respective gimbal supported lever arms.
Figure 7B:
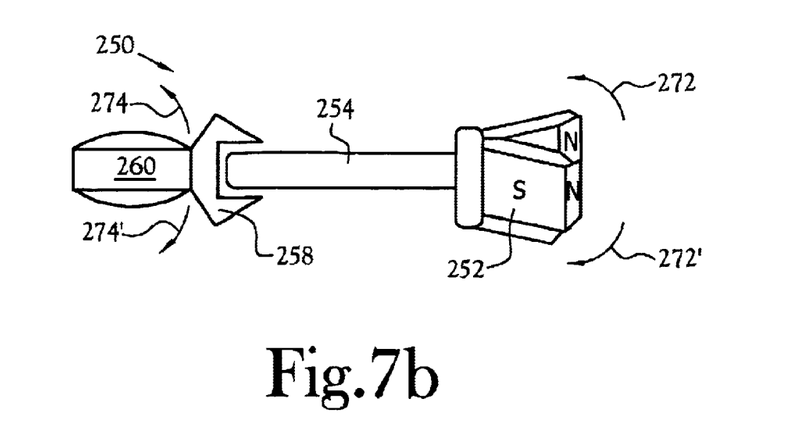
Figure 7C:
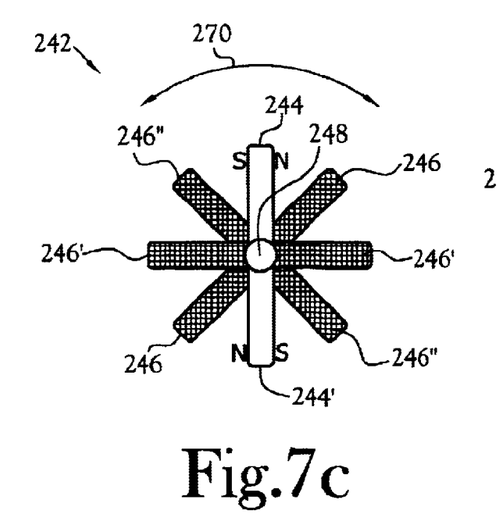
FIG. 7c is a side view of one rotatable impeller fin having a pair of opposed rotor magnets thereon.
Figure 7D:
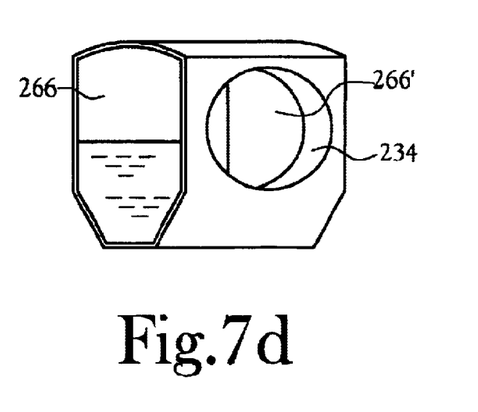
FIG. 7d is a cut-away view of a fluid channel of FIG. 7a, illustrating an intake channel and at least one side channels for fluid movement through the pump assembly.

An alternative embodiment of the motion converter is illustrated in FIGS.7a–7d, illustrating a motion converter operating as a pump assembly 230 for movement of fluids through a housing 232 utilizing a plurality of rotatable rotor magnet and impeller units 242 including pairs of opposed impeller fins 246, 246', 246" (see FIG. 7c) having at least one rotor magnet fin 244, and preferably two opposed rotor magnet fins 244, 244', interposed between the impeller fins (see FIG. 7c). The impeller fins 246, 246', 246" are mounted in a radially extended orientation to rotate 270 around an axial shaft 248 similar to a paddle wheel configuration that is positioned within a plurality of channels within the housing 232. The plurality of fluid channels include paired channels 236, 236', 238, 238', 240, 240', each include an impeller unit 242 therein. Each pair of channels 236, 236', 238, 238', 240, 240' are interconnected by side flow channels 266, 266' (see FIGS. 7a & 7d), to allow fluid that enters through input channels 234, 234', 234" to flow through respective side flow channels 266, 266', past each rotatable impeller unit 242, through respective central channels 268, for movement into, and out of, annulus channel 262.

Each pair of opposed rotor magnet fins 244, 244' includes respective north and south poles oriented in a circumferential path of rotation about each axial shaft 248 (see FIG. 7c). The net flux fields of the north and south poles of each pair of rotor magnet fins 244, 244' are directed substantially perpendicular to a radius from the axis of rotation of the axial shaft 248. The housing 232 includes a central fluid annulus 262 for flow of fluid out of the housing 232 upon the activation and rotation 270 of respective rotatable rotor magnet and impeller units 242. The housing 232 includes a plurality of magnet channels 264, 264', 264" angled radially outwards from a central non-linear pivot axis 260 within a central opening 260'. Each magnet channel 264, 264', 264" contains a gimbal connected magnet 252 therein, with each magnet 252 connected in a cantilevered position to a rigid, or alternatively a flexible shaft 254, 254', 254" that is connected to the central non-linear pivot axis 260 (see FIG. 7b). Each of the gimbal connected magnets 252, 252', 252" are disposed to reciprocate in a non-linear direction within each respective magnet channel 264, 264', 264", in response with reciprocation of central non-linear pivot axis 260. FIG. 7b illustrates reciprocation 272, 272' of each respective magnet 252, 252', 252" in response to non-linear movement 274, 274' of the central non-linear pivot 260. A connector joint 258 may be utilized to connect each shaft 254, 254', 254" to the central non-linear pivot 260. Upon non-linear movement of the central non-linear pivot 260, each respective magnet 252, 252', 252" is reciprocated within each respective magnet channel 264, 264', 264", with resulting repositioning of the magnet fields from each respective magnet 252, 252', 252" and resulting in rotation of each rotatable rotor magnet 244, 244' and impeller unit 242 having respective impeller fins 246, 246', 246" for movement of fluids through respective fluid channels 236, 236', 238, 238', 240, 240' and into central fluid annulus 262 for movement of fluid out of the housing 232. Flow may be reversed by changing the magnetic poles of the stator magnets 244, 244' and/or changing the magnetic pole orientation of the magnets 252, 252', 252" within the respective magnet channels 264, 264', 264". The housing 232 is stackable with like configured housings (not shown) to provide for additional capacity for pumping liquids.

Figure 8A:
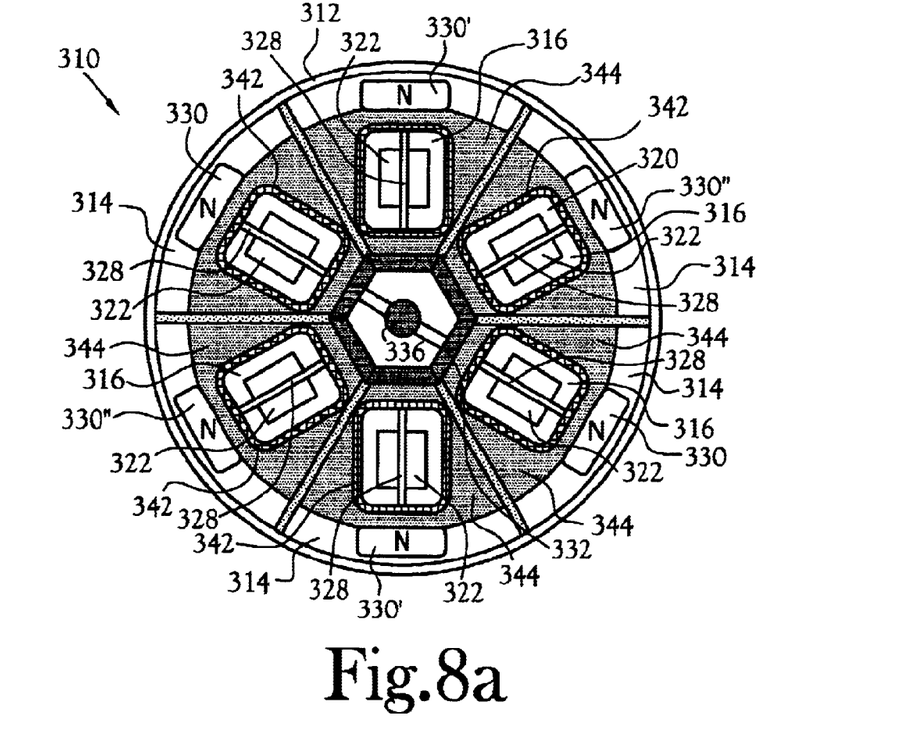
FIG. 8a is a cross-sectional top view of an electrical generator illustrating a plurality of rotor magnet units rotatable about separate axial shafts with induction elements interdisposed between the rotor magnet units and having a central magnet connected to a gimbal supported central shaft.
Figure 8B:
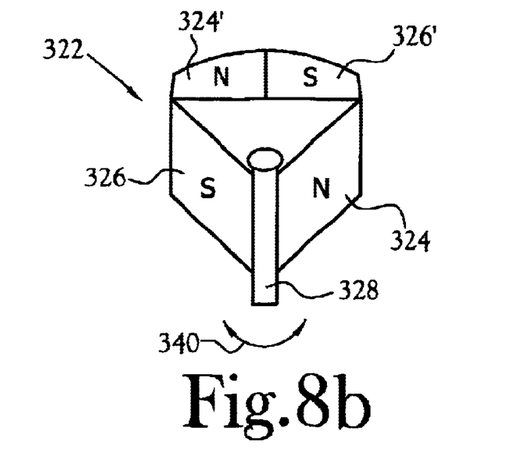
Figure 8C:
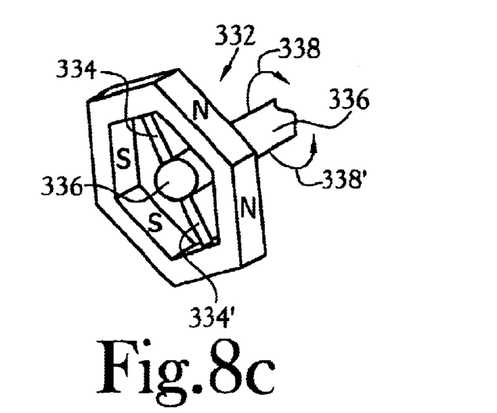
FIG. 8c is a side perspective view of the central magnet of FIG. 8a illustrating the central magnet supported by a gimbaled connection to a central shaft.

An alternative embodiment of the motion converter for utilization as an electrical generator 310 is illustrated in FIGS. 8a–8c. FIG. 8a is a top view of an electrical generator 310 having a housing 312 with a plurality of rotor magnet units 320 positioned to rotate within channels 316 oriented in a radial configuration in the housing 312. Each rotor magnet 322 of each rotor magnet unit 320 is rotated about a respective axial shaft 328 due to the influence of a changing magnetic flux field generated by non-linear movement of a central magnet 332, and the magnetic attracting or repelling of opposed pairs of stator magnets 330, 330', 330" positioned at a perimeter of the housing 312. Each of the rotor magnet units 320 are disposed to rotate within each channel 316 that is radially oriented in relation to a central channel 318 within the housing 312 in which the central magnet 332 is disposed to move. Each of the opposed pairs of stator magnets 330, 330', 330" are disposed in respective perimeter channels 314 that are in spaced apart orientation along the perimeter of the housing 312. Each rotor magnet unit 320 includes either a two-sided magnet (not shown), a three-sided magnet having a north and south pole on opposed, angled surfaces, or a multi-sided rotor magnet 322 having a north and south magnetic pole positioned on a perimeter surface of the rotor magnet 322. One configuration of the north and south magnetic poles include a north pole side 324, a south pole side 326, a north pole end surface 324', and a south pole end surface 326' on surfaces of each rotor magnet 322 as illustrated in FIG. 8b. Alternative orientations of north and south magnetic poles for each rotor magnet 322 may be utilized as known by one skilled in the art. The respective north and south poles are oriented in a circumferential path of rotation about the axial shaft 328, with the net flux fields of the north and south pole end surfaces 324', 326' directed substantially perpendicular to a radius from each axial shaft 328 around which each rotor magnet 322 rotates within each respective channel 316. Each channel 316 is oriented to extend radially away from the central magnet 332 positioned centrally in the housing 312 (see FIG. 8a). A counter-weight (not shown), or an additional magnet (not shown) may to attached to each axial shaft 328 in an opposed orientation from each respective rotor magnet 322. The rotation 340 of each rotor magnet 322 is induced by the non-linear movement of the central magnet 332, which includes outer perimeter and inner perimeter surfaces having respective north and south poles as illustrated in FIG. 8c. Central magnet 332 is connected to a pair of pivot connections 334, 334' that are connectable to a central axis 336 that is reciprocated in multiple directions 338, 338' by an external force imposed on central axis 336. Upon receipt of reciprocating motion along the central axis 336 and transmission by the pair of pivot connections 334, 334' of motion to the central magnet 332, the resulting repositioning of the respective north and south magnetic fields associated with central magnet 332 induces rotation of each rotor magnet 322 by repetitive attracting and repelling of the north and south poles of each rotor magnet 322, resulting in rotational movement 340 for each axial shaft 328. Rotation of each axial shaft 328 is converted by conversion devices and electrical circuitry (not shown) known to those skilled in the art, to provide electrical energy for power supply applications or for recharging of electrical energy storage units (not shown). In an alternative embodiment, the north and south poles of central magnet 332 are switched in orientation on respective inner perimeter and outer perimeter surfaces. In an additional alternative embodiment, each pair of stator magnets 330, 330', 330" may be connected by a perimeter connector bracket (not shown) to allow reciprocating movement induced by external forces for movement of each pair of stator magnets 330, 330', 330" in relation to each respective rotor magnet unit 320.

An alternative embodiment of the motion converter for utilization as an electrical generator 310 includes a housing 312 in which a plurality of magnetic induction units 342 and a plurality of electromagnetic elements 344 (see FIG. 8a) are disposed between the plurality of rotor magnet units 320 within separate channels 316. The magnetic induction units 342 are connectable to electric power timing circuitry (not shown) to generate and to provide pulsed electrical current to each electromagnet element 344 for re-orientating of the respective north and south magnetic fields of each electromagnet element 344, thereby inducing rotational movement 340 for each rotor magnet 322. The plurality of rotor magnet units 320 are rotated 340 about the axial shaft 328 due to the influence of the changing magnetic flux field generated by non-linear movement of the central magnet 332, and by the re-orientating of the north and south magnetic fields of the electromagnetic elements 344. Rotation 340 of each rotor magnet 322 is converted by conversion devices and electrical circuitry (not shown) known to those skilled in the art, to provide electrical energy for power supply applications or for recharging of electrical energy storage units (not shown).

From the foregoing description, it will be recognized by those skilled in the art that a non-linear magnetic harmonic drive motion converter apparatus has been provided. For embodiments connecting to motors and pumps for conversion of non-linear motion into rotational motion, the present invention provides simplicity of structure and provides a highly adaptable and efficient apparatus. Additional embodiments are utilized for motors, positioning devices, battery recharging units, gear actuation devices, transit and conveying components, motion conversion, drive-trains, drive motors for water craft, and harnessing of energy from wave motion in aquatic environments.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described herein. Accordingly, departures may be made from such details without departing from the spirit or scope of applicant's general inventive concept as described in the appended claims.

I claim:

1. A non-linear magnetic harmonic motion converter apparatus comprising:

a ring magnet disposed to rotate about a longitudinal axis, said ring magnet having respective north and south poles distributed along an outer perimeter and an inner perimeter, said ring magnet having a gimbal ring connector disposed within said inner perimeter to provide gimbaled movement between said inner perimeter of said ring magnet and said longitudinal axis;

an axial shaft having an axis of rotation disposed parallel with said longitudinal axis of said ring magnet, said axial shaft extended through said gimbal ring connector, said axial shaft rotatable in relation to said ring magnet; and at least one rotor magnet disposed on said axial shaft, said at least one rotor magnet rotates in unison with said axial shaft, said at least one rotor magnet having a rotor magnetic field defined by respective north and south poles of said at least one rotor magnet, said rotor magnetic field is oriented in a circumferential path of rotation about said axial shaft, said rotor magnetic field is directed substantially perpendicular to a radius from said axis of rotation of said axial shaft, said rotor magnetic field is alternately attracted to and repelled by the north and south poles of said ring magnet to induce rotation of said axial shaft when said ring magnet is reciprocated in relation to said axial shaft.

2. The apparatus of claim 1 wherein said axial shaft including a plurality of rotor magnets disposed in spaced apart orientation along said axial shaft, each rotor magnet having respective rotor magnetic fields oriented in a circumferential path of rotation about said axial shaft, each respective rotor magnetic field is alternately attracted to and repelled by said first magnetic field of said ring magnet to induce rotation of said axial shaft when said first ring magnet is reciprocated in relation to said axial shaft.

3. The apparatus of claim 2 wherein said plurality of rotor magnets including a plurality of pairs of rotor magnets positioned in spaced apart configuration along said axial shaft, each pair of said plurality of pairs of rotor magnets are separated by an angle of separation in a range between about 90 degrees of separation to about 180 degrees of separation.

4. The apparatus of claim 2 wherein said ring magnet including a plurality of ring magnets disposed in spaced apart and concentric orientation along said axial shaft, each ring magnet having respective gimbal ring connectors disposed within each inner perimeter to provide gimbaled movement between each respective ring magnet and said longitudinal axis.

5. The apparatus of claim 4 wherein said plurality of ring magnets are interconnected by a plurality of side members disposed in substantially parallel orientation on respective portions of said outer perimeter of each respective ring magnet, said side members further includes a plurality of pivot connectors to pivotably connect each side member to said outer perimeter of each respective ring magnet, each of said side members are substantially parallel to said axial shaft and are reciprocatingly moved substantially parallel to said axial shaft;

whereby said plurality of side members are reciprocatingly moved by an externally provided reciprocating force with resulting movement of each respective ring magnet and resulting re-orientation of respective ring magnetic fields alternately attracting and repelling said rotor magnets to induce rotation of said axial shaft with each reciprocation of said plurality of side members.

6. The apparatus of claim 5 wherein said plurality of side members further including at least one perimeter magnet disposed at about a midpoint of each side member, each perimeter magnet includes respective north and south poles having a perimeter magnetic field of sufficient strength to extend proximal to said axial shaft for interaction with said rotor magnetic fields of said plurality of rotor magnets along said axial shaft.

7. The apparatus of claim 1 wherein said ring magnet is enclosed by a housing having a spherical shape, said ring magnet and said gimbal ring connector move upon reciprocating movement of said housing, whereby with each movement of said ring magnet in response to movement of said housing, said at least one rotor magnet is alternately attracted to and repelled by the movement of the respective north and south poles of said ring magnet to induce rotation of said axial shaft.

8. The apparatus of claim 1 wherein said ring magnet is connected to a platform disposed in spaced apart and concentric orientation from said ring magnet, said platform having an outer perimeter to which a plurality of side members are connectable in substantially parallel orientation between respective portions of said outer perimeter of said ring magnet and said outer perimeter of said platform, said side members including a plurality of pivot connectors to pivotably connect each side member to said outer perimeter of said ring magnet, each of said side members are substantially parallel to said axial shaft and are reciprocatingly moved substantially parallel to said axial shaft, said platform and said plurality of side members are reciprocatingly moved by an externally provided reciprocating force with resulting movement of said ring magnet and resulting re-orientation of respective magnetic fields alternately attracting and repelling said at least one rotor magnet to induce rotation of said axial shaft with each reciprocation of said platform and said plurality of side members.

9. A non-linear magnetic harmonic motion converter apparatus comprising:
a plurality of ring magnets aligned in spaced apart orientation to reciprocate in relation to a longitudinal axis, each of said plurality of ring magnets including respective north and south poles distributed along an outer perimeter and an inner perimeter of each one of said plurality of ring magnets, each ring magnet having a gimbal ring connector disposed within said inner perimeter to provide gimbaled movement between said inner perimeter of each ring magnet and said longitudinal axis;
an axial shaft having an axis of rotation disposed parallel with said longitudinal axis of said ring magnet, said axial shaft extended through said gimbal ring connector of each ring magnet, said axial shaft is rotatable in relation to said plurality of ring magnets;
a plurality of side members disposed in substantially parallel orientation, said plurality of side members interconnected between said plurality of ring magnets on respective portions of said outer perimeter of each respective ring magnet, said side members including a plurality of pivot connectors to pivotably connect each side member to said outer perimeter of each respective ring magnet, each of said side members are substantially parallel to said axial shaft and are reciprocatingly moved substantially parallel to said axial shaft; and
at least one rotor magnet disposed on said axial shaft, said at least one rotor magnet rotates in unison with said axial shaft, said at least one rotor magnet having a rotor magnetic field defined by respective north and south poles oriented in a circumferential path of rotation about said axial shaft with the net flux field of said rotor magnetic field is directed substantially perpendicular to the axis of rotation of said axial shaft, said rotor magnetic field is extended from said axial shaft, said rotor magnetic field is alternately attracted to and repelled from respective north and south poles of each one of said plurality of ring magnets to induce rotation of said axial shaft when said plurality of ring magnets and said plurality of side members are reciprocatingly moved in relation to said axial shaft.

10. The apparatus of claim 9 wherein said at least one rotor magnet includes a plurality of pairs of rotor magnets positioned in spaced apart configuration along said axial shaft, each pair of said plurality of pairs are separated by an angle of separation of a range between about 90 degrees of separation to about 180 degrees of separation.

11. The apparatus of claim 9 wherein said plurality of ring magnets are positioned within a housing having buoyancy for movement with wave motions of a body of water, said housing including a plurality of connector members extended internally to attach to at least one outer perimeter of said plurality of ring magnets, said plurality of connector members suspend said plurality of ring magnets within said housing to allow gimbaled movement of each ring magnet in response to said housing movement with wave motions, whereby said rotor magnetic field of said at least one rotor magnet is alternately attracted to and repelled from respective north and south poles of each one of said plurality of ring magnets to induce rotation of said axial shaft in relation to said ring magnets, upon the gimbaled movement of respective ring magnets in response to movement of said housing having buoyancy due to wave motions of the body of water.

12. The apparatus of claim 9 wherein said plurality of side members including at least one perimeter magnet disposed proximal a midpoint of each side member, each perimeter magnet having respective north and south poles having a perimeter magnetic field of sufficient strength to extend to said axial shaft, wherein said rotor magnetic field is alternately attracted to and repelled from said perimeter magnetic field of each perimeter magnet to induce rotation of said axial shaft when said plurality of ring magnets and said plurality of side members are reciprocatingly moved in relation to said axial shaft.

13. A non-linear magnetic harmonic motion converter apparatus comprising:
an upper and a lower platform disposed in spaced apart orientation, said upper and lower platforms having inwardly faced surfaces interconnected by an axial shaft, said axial shaft having opposed first and second ends connected by respective first and second gimbal connectors to said upper and lower platforms at opposed ends of said axial shaft, each of said upper and lower platforms having north and south magnet fields disposed respectively on a perimeter of each platform and on said inwardly faced surface of each platform;
a sleeve bearing positioned to rotate around said axial shaft, said sleeve bearing is disposed to reciprocatingly rotate between said first and second gimbal connectors; and
at least one rotor magnet disposed to extend from said sleeve bearing, said at least one rotor magnet having a rotor magnetic field defined by respective north and south poles oriented in a circumferential path of rotation about said axial shaft with the net flux fields of the north and south poles directed substantially perpendicular to the axis of rotation around said axial shaft, said at least one rotor magnet is rotatable upon gimbaled movement of said upper or lower platform;
whereby said north and south magnet fields of said upper and lower platforms are re-positioned upon movement of either upper and lower platform, with alternately attracting and repelling of said rotor magnetic field to induce rotation of said axial shaft with movement of either upper and lower platform.

14. A non-linear magnetic harmonic motion converter apparatus comprising:
an upper and a lower platform disposed in spaced apart orientation, said upper and lower platforms having inwardly faced surfaces interconnected by an axial shaft, said axial shaft having opposed first and second ends connected between said upper and lower platforms, said upper platform supported to reciprocate above said lower platform, said axial shaft extended through said lower platform to allow for rotation of said axial shaft relative to said upper and lower platforms;
a ring magnet disposed to rotate about said axial shaft extended through said ring magnet, said ring magnet having a ring magnetic field defined by respective north and south poles disposed along an outer perimeter and an inner perimeter of said ring magnet, said ring magnet having a gimbal ring connector disposed within said inner perimeter, said axial shaft extends through said gimbal ring connector to provide gimbaled movement of said ring magnet relative to said axial shaft, said ring magnet having an outer perimeter from which two pivot arms are extended on opposed sides of said outer perimeter;

at least two pair of support members disposed in substantially parallel orientation from opposed sides of said lower platform, each pair of support members are in spaced apart configuration for sliding insertion therebetween of respective pivot arms of said rotor magnet, said at least two pair of support members do not obstruct the reciprocation of said upper platform above said lower platform;

a plurality of side members disposed in substantially parallel orientation between respective portions of said outer perimeter of said ring magnet and said upper platform, said plurality of side members further includes a plurality of pivot connectors to pivotably connect each side member between said outer perimeter of said ring magnet and said outer perimeter of said upper platform, each of said side members is substantially parallel to said axial shaft and is reciprocatingly moved substantially parallel to said axial shaft, whereby said plurality of side members are reciprocatingly moved by an externally provided reciprocating force applied to said upper platform with resulting movement of said ring magnet and resulting repositioning of the north and south poles of said ring magnet in relation to said axial shaft; and at least one rotor magnet disposed to extend from said axial shaft, said at least one rotor magnet rotates in unison with said axial shaft, said at least one rotor magnet having a rotor magnetic field defined by respective north and south poles oriented in a circumferential path of rotation about said axial shaft with the net flux field of said rotor magnetic field is directed substantially perpendicular to the axis of rotation of said axial shaft, said rotor magnetic field is alternately attracted to and repelled from respective north and south poles of said ring magnet to induce rotation of said axial shaft when said ring magnets and said plurality of side members are reciprocatingly moved in relation to said axial shaft;

whereby said ring magnet and said upper platform are moved relative to said lower platform with said ring magnetic field repositioned with each movement of said ring magnet in response to external force on said upper platform, said rotor magnetic field is alternately attracted and repelled by repositioning of said ring magnetic field to induce rotation of said axial shaft with each movement of said at least one ring magnet and said upper platform.

* * * * *